(12) United States Patent
Hannuksela

(10) Patent No.: US 8,140,933 B2
(45) Date of Patent: *Mar. 20, 2012

(54) BUFFERING PACKETS OF A MEDIA STREAM

(75) Inventor: Miska Hannuksela, Fuutann (FI)

(73) Assignee: Nokia Corporation, Espoo (FI)

( * ) Notice: Subject to any disclaimer, the term of this patent is extended or adjusted under 35 U.S.C. 154(b) by 1175 days.

This patent is subject to a terminal disclaimer.

(21) Appl. No.: 11/982,235

(22) Filed: Oct. 31, 2007

(65) Prior Publication Data

US 2008/0065965 A1    Mar. 13, 2008

Related U.S. Application Data

(63) Continuation of application No. 10/991,128, filed on Nov. 16, 2004, now Pat. No. 7,447,978.

(51) Int. Cl.
*H04B 1/74* (2006.01)
(52) U.S. Cl. ........................ 714/755; 714/776
(58) Field of Classification Search .................. 714/755, 714/776
See application file for complete search history.

(56) References Cited

U.S. PATENT DOCUMENTS

| | | | |
|---|---|---|---|
| 5,534,937 A | 7/1996 | Zhu et al. | |
| 6,141,448 A | 10/2000 | Khansari et al. | |
| 6,145,109 A | 11/2000 | Schuster et al. | |
| 6,175,871 B1 | 1/2001 | Schuster et al. | |
| 6,278,716 B1 | 8/2001 | Rubenstein et al. | |
| 6,289,054 B1 | 9/2001 | Rhee | |
| 6,317,462 B1 | 11/2001 | Boyce | |
| 6,421,387 B1 | 7/2002 | Rhee | |
| 6,542,549 B1 | 4/2003 | Tan et al. | |
| 7,447,978 B2 * | 11/2008 | Hannuksela | 714/776 |
| 7,864,805 B2 * | 1/2011 | Hannuksela | 370/473 |
| 2002/0105951 A1 | 8/2002 | Hannuksela et al. | |
| 2002/0136310 A1 | 9/2002 | Saunders et al. | |

FOREIGN PATENT DOCUMENTS

EP    0768768    4/1997

(Continued)

OTHER PUBLICATIONS

"Technical Specification Group Services and System Aspects; Multimedia Broadcast/Multicast Service (MBMS); protocols and Codecs;" $3^{rd}$ Generation Partnership Project; Release 6; 3GPP TS 26.346 V2.0.0 (Mar., 2005).

(Continued)

*Primary Examiner* — Stephen Baker
(74) *Attorney, Agent, or Firm* — Alfred A. Fressola; Ware, Fressola, Van Der Sluys & Adolphson LLP

(57) ABSTRACT

Buffering packets of a media stream for transmission from a transmitting device to a receiving device. Media packets are formed from at least one kind of media information in a stream generator; forward error correction data is formed on the basis of the media packets; one or more repair packets are formed on the basis of the forward error correction data; and a transmission schedule is generated for packets to be transmitted. In addition, hypothetical decoding is also performed according to the transmission schedule. The hypothetical decoding comprises buffering the packets to be transmitted according to the transmission schedule to a hypothetical decoding buffer; and controlling the buffer occupancy level of the hypothetical decoding buffer by controlling the operation of the stream generator.

25 Claims, 5 Drawing Sheets

FOREIGN PATENT DOCUMENTS

| GB | 2344031 | 5/2000 |
| WO | WO 01/37571 | 5/2001 |

OTHER PUBLICATIONS

Nokia 1: "Proposals for RTP FEC payload format in MBMS"; 3GPP Draft; S4-AHP166, 3rd Generation Partnership Project, Mobile Competence Centre; France; vol. SA WG4, No. Sophia Antipolis, France: Oct. 11, 2004; XP050282578; sections 3 and 5.

Nokia 1: "Reed-Solomon FEC for MBMS"; 3GPP Draft; S4-AHP171, $3^{rd}$ Generation Partnership Project, Mobile Competence Centre; France; vol. SA WG4, No. Sophia Antipolis, France; Oct. 11, 2004; XP050282583; whole document.

Nokia 1: "FEC Buffering for MBMS Streaming Delivery Method"; 3GPP Draft; S4-040672 FEC Buffering for MBMS Streaming, $3^{rd}$ Generation Partnership Project; Mobile Competence Centre; France; vol. SA WG4, No. Helsinki, Finland; Nov. 17, 2004; XP050287198; whole document.

* cited by examiner

BUFFERING PACKETS OF A MEDIA STREAM

CROSS-REFERENCE TO RELATED APPLICATIONS

This application is a continuation of U.S. patent application Ser. No. 10/991,128 filed on Nov. 16, 2004 now U.S. Pat. No. 7,447,978 and claims domestic priority to said application under 35 USC §120.

FIELD OF THE INVENTION

The invention relates to buffering packets of a media stream for transmission from a transmitting device to a receiving device. The invention also relates to a system, a transmitting device, a receiving device, a server, a wireless communication device, a signal and a computer program product.

BACKGROUND OF THE INVENTION

Transmission of media information such as audio signal, video signals, still images etc. is typically based on packetization i.e. information to be transmitted is framed into packets. The packets are then transmitted as one or more packet streams. The packet streams can be transmitted e.g. as RTP (Real Time Protocol) packets or as packets of an other protocol which are not necessarily RTP packets. It may happen that some of the packets get lost for some reason during the transmission. For example, the transmission channel may be affected by disturbances which may weaken the signals which carry the packet stream and cause losses to the packet stream. In the transmission stage it is possible to add some error recovery information to the packet stream which can be used at the receiving stage to recover lost packets. One known method is based on forward error correction (FEC) in which extra packets carrying error recovery information are inserted to the packet stream. Such extra packets are called as repair RTP packets in this description i.e. packets carrying error recovery information. The repair RTP packets are formed on the basis of those packets which should be protected by the repair RTP packets. For example, a bitwise XOR operation is performed on data of the packets and the calculated FEC values are packetized to form the repair RTP packets. The repair RTP packets and the packets which are used in forming the repair FEC packets forms an FEC block. Therefore, the packet losses of an FEC block may be recoverable by using the information of the repair RTP packets of the same FEC block.

The same media information may be delivered to multiple receivers by using e.g. the Multimedia Broadcast/Multicast Service (MBMS) streaming delivery method. In this method there is not a separate media stream for each receiver but different receivers receive the same media stream. Some of the packets need to be stored (buffered) in the receiver before the decoding and playback of the media stream can be started. There is also a need to buffer packets of the media stream during the reception of the media stream.

When the streaming delivery method of MBMS is in use, media buffering needs to be controlled to minimize delay and allocated memory. The decoding of the media stream of RTP packets requires initial buffering in the receiving device because if the receiver started to decode source RTP packets (i.e. media RTP packets) immediately when the first one is received, any lost source RTP packet would cause a delay in decoding until the repair RTP packets of the FEC block are received. This would consequently cause a pause in the playback.

The duration to receive an FEC block, i.e. the time which elapses from the reception of the first bit of the first RTP packet of the FEC block until the reception of the last bit of the last RTP packet of the same FEC block (as well as interleaving of source and repair RTP packets), varies, because the size of source RTP packets varies in terms of bytes and the number of source RTP packets and the number of repair RTP packets in an FEC block varies.

It may happen that the first FEC block that the receiver receives is shorter in terms of bytes compared to some of the succeeding FEC blocks. Consequently, initial buffering of one FEC block entirely is not a sufficient condition to guarantee pauseless decoding and playback. Therefore, senders should give receivers information that allows sufficient but not exhaustive amount of initial buffering.

As the MBMS is a multicast/broadcast service, new receivers may "tune in" in the middle of the stream i.e. new receivers may begin to receive the stream later than the first packet of the stream was transmitted. The optimal (minimum) initial buffering delay is usually not constant throughout the stream.

Size of FEC Decoding Buffer

As was shown above, received RTP packets have to be buffered before the decoding of the FEC packets can be started. Such a buffer is called as an FEC decoding buffer in this description. The buffer occupancy level of the FEC decoding buffer depends inter alia on 1) the transmission schedule of source and repair RTP packets, 2) the amount of initial buffering before starting the emptying of the buffer, 3) the method of building an FEC matrix inside the FEC decoding buffer, and 4) the output rate of data from the FEC decoding buffer. The maximum buffer occupancy level determines the required buffer size for the stream. It is evident that in different receiving device implementations the FEC decoding and the related buffering may be implemented differently compared to each other. For example, players may have a different approach for output rate handling—one device may push data out from the FEC decoding buffer as soon as the buffers "downstream" (i.e. decoder input buffers) allow, and another device may pull data out from the FEC decoding buffer just on time when the next piece of data is needed for decoding. Therefore, the maximum buffer occupancy level may vary in different implementations, and consequently it is problematic to determine the required FEC decoding buffer size of a particular stream.

Encoders and transmitters should also be aware of the supported FEC decoding buffer size of all receivers when performing FEC encoding and transmission scheduling.

SUMMARY OF THE INVENTION

The present invention implements a hypothetical decoder buffering model in the media streaming. The model can be used to determine a minimum requirement for receivers/decoders to be able to process at least all the streams that the hypothetical model is capable of processing. Encoders and transmitters use the hypothetical decoder buffering model to verify that the transmitted stream does not cause overflows or underflows in the hypothetical decoding buffer.

According to a first aspect of the present invention there is provided a method for buffering packets of a media stream comprising:

forming media packets from at least one kind of media information in a stream generator;

forming forward error correction data on the basis of the media packets;

forming one or more repair RTP packets on the basis of the forward error correction data;

generating a transmission schedule for packets to be transmitted; and performing hypothetical decoding according to the transmission schedule comprising buffering the packets to be transmitted according to the transmission schedule to a hypothetical decoding buffer; and controlling the buffer occupancy level of the hypothetical decoding buffer by controlling the operation of the stream generator.

According to a second aspect of the present invention there is provided a system for buffering a media stream comprising at least one kind of media information for transmission from a transmitting device to a receiving device, the transmitting device comprising:

a stream generator comprising a first packetizer for forming packets from the media stream;

an error correction code definer for forming forward error correction data on the basis of the media packets;

a second packetizer for forming one or more repair RTP packets on the basis of the forward error correction data; and a scheduler for generating a transmission schedule for packets to be transmitted; and a hypothetical decoder for performing hypothetical decoding during the transmission according to the transmission schedule comprising a hypothetical buffer for buffering the packets to be transmitted according to the transmission schedule; and a controller for controlling the buffer occupancy level of the hypothetical decoding buffer by controlling the operation of the stream generator.

According to a third aspect of the present invention there is provided a transmitting device comprising a buffer for buffering a media stream comprising at least one kind of media information for transmission from the transmitting device to a receiving device, the transmitting device further comprising:

a stream generator comprising a first packetizer for forming packets from the media stream;

an error correction code definer for forming forward error correction data on the basis of the media packets;

a second packetizer for forming one or more repair RTP packets on the basis of the forward error correction data; and a scheduler for generating a transmission schedule for packets to be transmitted; and a hypothetical decoder for performing hypothetical decoding during the transmission according to the transmission schedule comprising a hypothetical buffer for buffering the packets to be transmitted according to the transmission schedule; and a controller for controlling the buffer occupancy level of the hypothetical decoding buffer by controlling the operation of the stream generator.

According to a fourth aspect of the present invention there is provided a wireless communication device comprising a buffer for buffering a media stream comprising at least one kind of media information for transmission from the wireless communication device to a receiving device, the wireless communication device further comprising:

a stream generator comprising a first packetizer for forming packets from the media stream;

an error correction code definer for forming forward error correction data on the basis of the media packets;

a second packetizer for forming one or more repair RTP packets on the basis of the forward error correction data; and a scheduler for generating a transmission schedule for packets to be transmitted; and a hypothetical decoder for performing hypothetical decoding during the transmission according to the transmission schedule comprising a hypothetical buffer for buffering the packets to be transmitted according to the transmission schedule; and a controller for controlling the buffer occupancy level of the hypothetical decoding buffer by controlling the operation of the stream generator.

According to a fifth aspect of the present invention there is provided a server comprising a buffer for buffering a media stream comprising at least one kind of media information for transmission from the server to a receiving device, the server further comprising:

a stream generator comprising a first packetizer for forming packets from the media stream;

an error correction code definer for forming forward error correction data on the basis of the media packets;

a second packetizer for forming one or more repair RTP packets on the basis of the forward error correction data; and a scheduler for generating a transmission schedule for packets to be transmitted;

a hypothetical decoder for performing hypothetical decoding during the transmission according to the transmission schedule comprising a hypothetical buffer for buffering the packets to be transmitted according to the transmission schedule; and a controller for controlling the buffer occupancy level of the hypothetical decoding buffer by controlling the operation of the stream generator; and a transmitter for transmitting the packets to the receiving device.

According to a sixth aspect of the present invention there is provided a Multimedia Broadcast/Multicast Service server comprising a buffer for buffering a media stream comprising at least one kind of media information for transmission from the server to a receiving device, the server further comprising:

a stream generator comprising a first packetizer for forming packets from the media stream;

an error correction code definer for forming forward error correction data on the basis of the media packets;

a second packetizer for forming one or more repair RTP packets on the basis of the forward error correction data; and a scheduler for generating a transmission schedule for packets to be transmitted;

a hypothetical decoder for performing hypothetical decoding during the transmission according to the transmission schedule comprising a hypothetical buffer for buffering the packets to be transmitted according to the transmission schedule; and a controller for controlling the buffer occupancy level of the hypothetical decoding buffer by controlling the operation of the stream generator; and a transmitter for transmitting the packets as a Multimedia Broadcast/Multicast Service.

According to a seventh aspect of the present invention there is provided a receiving device for receiving a media stream comprising at least repair RTP packets formed on the basis of at least one kind of media information, the receiving device comprising:

a receiver for receiving the packet stream including forward error correction data and information of an initial buffering amount for delaying the decoding of the packets at the beginning of reception of the packets;

a first de-packetizer for separating the packets from the media stream;

a buffer for buffering the information of the packets;

a decoder for decoding media information of the packets; and a controller for delaying the decoding according to the information of the initial buffering amount.

According to an eighth aspect of the present invention there is provided a signal for transmitting a media stream comprising at least repair RTP packets formed on the basis of at least one kind of media information, wherein the signal comprises information of an initial buffering amount for delaying the decoding of the packets at the beginning of reception of the signal.

According to a ninth aspect of the present invention there is provided a computer program product comprising a computer program which comprises machine executable steps for buffering packets of a media stream by forming media packets from at least one kind of media information in a stream generator of a transmitting device;

forming forward error correction data on the basis of the media packets;

forming one or more repair RTP packets on the basis of the forward error correction data;

generating a transmission schedule for packets to be transmitted; and performing hypothetical decoding according to the transmission schedule comprising machine executable steps for buffering the packets to be transmitted according to the transmission schedule to a hypothetical decoding buffer; and controlling the buffer occupancy level of the hypothetical decoding buffer by controlling the operation of the stream generator.

DESCRIPTION OF THE DRAWINGS

In the following the present invention will be described in more detail with reference to the appended drawings in which.

DETAILED DESCRIPTION OF THE INVENTION

Figure 1:
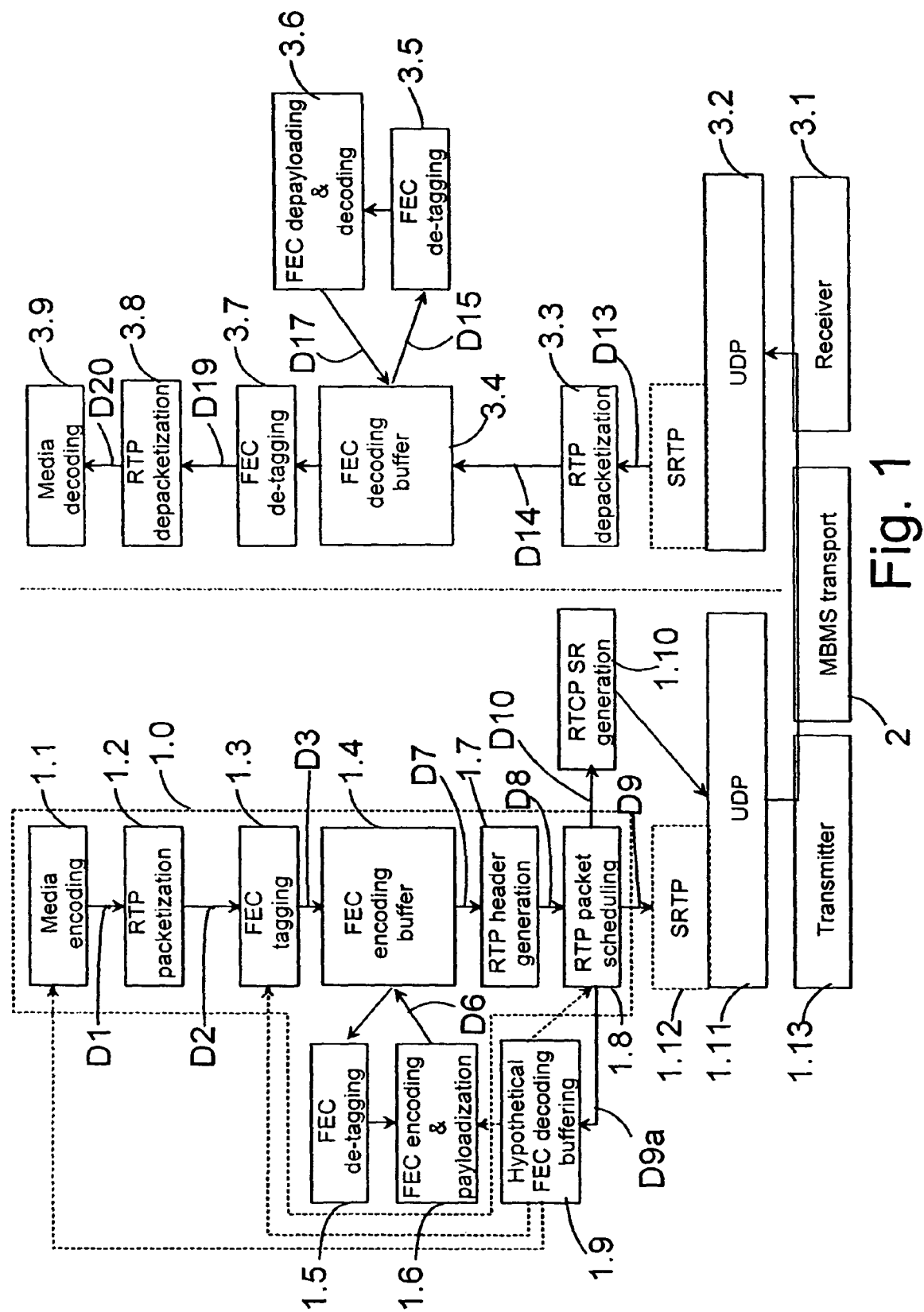
FIG. 1 depicts a system according to an example embodiment of the present invention.
Figure 2:
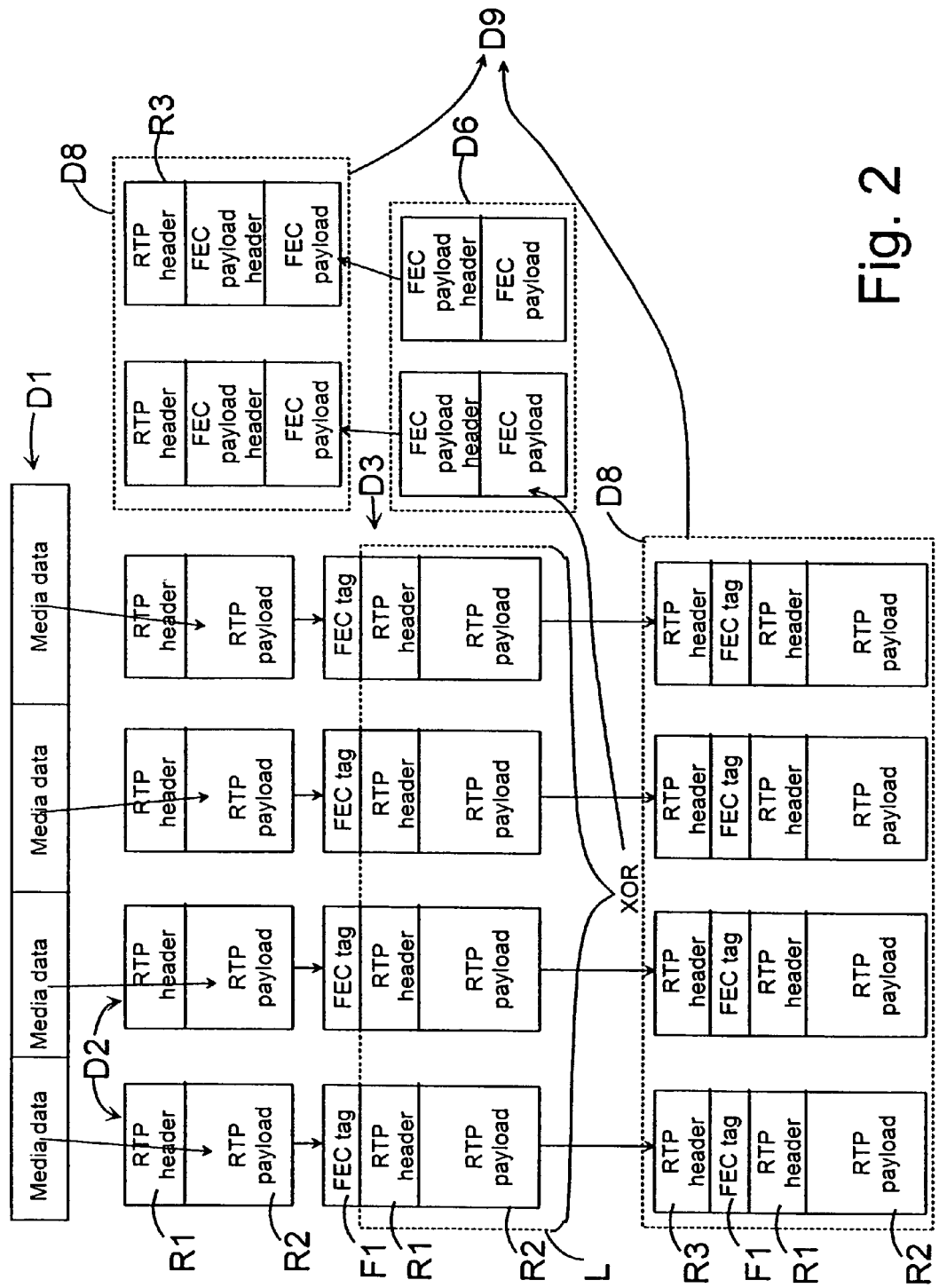
FIG. 2 depicts details of an example of a media packet stream.
Figure 3:
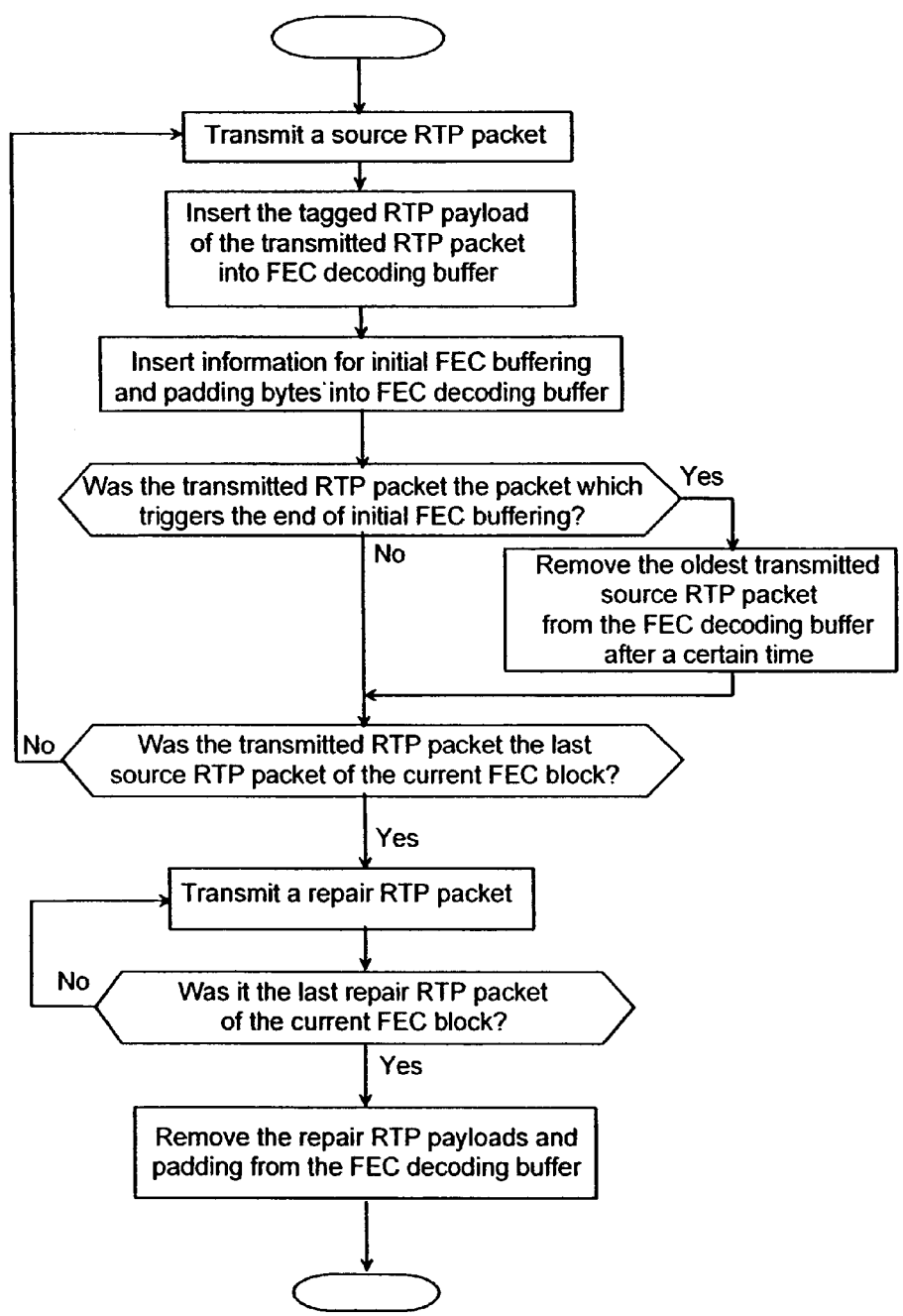
FIG. 3 shows a method according to an example embodiment of the present invention as a simplified flow diagram.

In the following a system according to an example embodiment of the present invention is described in more detail with reference to FIGS. 1 and 2. The system of FIG. 1 comprises a transmitting device 1, a transmission channel 2 and a receiving device 3. The transmitting device 1 can be e.g. a server, a wireless communication device, a personal computer etc. The receiving device 3 can be e.g. a wireless communication device, a personal computer, a TV etc.

The transmitting device 1 comprises a stream generator 1.0 for forming packet stream from one or more media streams. In this embodiment the stream generator 1.0 comprises an encoder 1.1 for encoding the media information, a packetizer 1.2, a tagging block 1.3, an FEC encoding buffer 1.4, a detagging block 1.5, a FEC encoder block 1.6, a header generator 1.7, and an RTP packet scheduling block 1.8. The encoder 1.1 creates a data flow D1, which contains an encoded bitstream or a stream of application data units (ADUs, such as NAL units of the standard H.264/AVC). The data flow D1 is transferred to the packetizer 1.2 in which the data flow D1 is encapsulated into media payloads R2 such as RTP payloads (FIG. 2) according to the RTP payload specification of the format and a first header R1 such as an RTP header is created for each media payload R2. Next, these source RTP packets (data flow D2 in FIG. 1) are further processed in the tagging block 1.3, which forms a "tagged media payload" by concatenating the source RTP packet D2 (including its first header R1) and "an FEC tag" F1 that indicates which source block D3 they are part of and where they fit into the source block D3. The tagged source media payloads (data flow D3) are stored into the FEC encoding buffer 1.4.

To enable the error recovery of lost RTP packets the necessary error recovery information has to be formed. In this embodiment the repair RTP packets are formed in the following way. The detagging block 1.5 removes the FEC tag from the tagged source media payloads of a particular FEC block. Then, the FEC encoder block 1.6 calculates the error correction code over these source RTP packets (including their first headers as is illustrated with the dashed line L in FIG. 2), and forms payloads for repair RTP packets containing the error correction code for the source RTP packets D2. The payloads for repair RTP packets (data flow D6) are stored in the FEC encoding buffer 1.4 as well.

The RTP packet scheduling block 1.8 decides the pace for transmitting RTP packets. There are many possibilities to specify how the RTP packet scheduling process operates. For example, the RTP packets can be sent at a constant average bitrate, assuming a constant bitrate access link. However, the RTP packet scheduling does not have much importance to the operation of the invention. Therefore, it is not necessary to discuss it in more detail in this application.

Before the RTP packets can be transmitted, second header information has to be attached with the payload of the repair RTP packets and with the tagged source media payloads. This is performed by the header generator 1.7. The header generator 1.7 fetches the corresponding payload R1 (i.e. the tagged source media payload or the repair RTP payload) from the FEC encoding buffer (data flow D7) and a second header is appended to the payload to form an RTP packet. The RTP packets are transferred to the packet scheduler 1.8 (data flow D8).

In an embodiment in which packets according to the RTP protocol are formed the first header is an RTP header comprising a parameter which indicates that the payload is of media type i.e. the header can also be called as a media RTP header. Respectively, the second header is an RTP header comprising a parameter which indicates that the payload is of FEC type i.e. the header can also be called as an FEC header. However, the invention is not restricted to RTP protocol and RTP headers but other kind of packetization and headers can also be used.

The packet scheduler 1.8 controls the outputting of an RTP packet so that each RTP packet shall be transmitted at an appropriate moment according to the scheduling process in use. RTP sequence numbers and RTP timestamps can be attached to the RTP packets. The sequence number can be used in the receiving device 3 to determine if there are packet losses. The RTP timestamp usually reflects a nominal sampling time of first sample in an RTP packet. The order in which the RTP packets can be is, for example, such that all the source RTP packets of one FEC block are transmitted before the repair RTP packet(s) block is/are transmitted. It is, however, obvious that ordering different from that can be applied. For example, the source RTP packets and the repair RTP packets can be interleaved.

The RTP packet is transferred from the packet scheduler 1.8 (data flow D9) to a transmitting block 1.11 either directly or through an optional encryptor 1.12 (data flow D9). In the encryptor 1.12 the packets may be protected against eavesdropping by performing some encryption operation to the contents of the RTP packets and integrity protection of a stream of RTP packets. For example, Secure Real Time Transport Protocol (SRTP) may optionally be used.

The RTP packets (either as such or as encrypted) may further be packetized by framing the RTP packets by a transport protocol such as UDP (User Datagram Protocol) before transmission. This is accomplished by a transmission protocol block 1.13. When the necessary transport protocol conversions are performed, the packets can be transmitted to the transmission channel 2 by a transmitter 1.13 of the device 1 which is known as such. The transmission can be wireless or wired transmission or both wired and wireless transmission can be applied in different links of the transmission path. The transmission channel can comprise one or more nodes, base stations etc. through which the packet stream is transmitted. The details of the transmission channel and the transmission method are known as such and it is not necessary to describe them in more detail here.

The packets are not necessarily transmitted after the scheduling process is performed but it is also possible that the packets are stored in a memory, for example as a file. The file may also be included with additional information such as a so called hint track. The hint track contains information needed to stream a movie, such as how data is to be encoded and packaged, and according to which packet transmission schedule it will be transmitted.

In the transmitting device 1 the RTP packet may also be forwarded from the packet scheduler 1.8 to a sender report generator 1.10 (data flow D10). When an RTP packet is transmitted, the packet and byte count of RTCP sender reports (SRs) are updated accordingly by the sender report generator 1.10, if such a counter system is in use.

In the system according to the present invention the RTP packets are also transferred to a hypothetical decoder 1.9 (data flow D9*a*). The operation of the hypothetical decoder 1.9 is described in more detail later in this description. The hypothetical FEC decoder may control the pace of RTP packet scheduling, the number of created repair RTP packets (per each FEC block) and the number of source RTP packets in each FEC block. These control operations are indicated with dashed lines in the FIG. 1.

It should be noted here that other arrangements of an MBMS sender are also possible. For example, it is possible to store source RTP packets without FEC tags in the FEC encoding buffer and add FEC tags after generation of repair RTP packets.

In the following, the operation of the receiving device 3 is described in more detail. The receiver 3.1 receives the signals which carry the transmitted packet stream and performs the necessary demodulation operations wherein the receiver 3.1 outputs the demodulated information to the protocol converter 3.2. In the protocol converter 3.2 the demodulated information is converted to RTP packet stream. The protocol converter 3.2 may perform, when necessary, UDP protocol conversions and decryption operations, to reconstruct the RTP packet flow (data flow D13).

The second headers R3 of the source and repair packets are removed in the depacketizer 3.3. The second headers R3 may be used for inter-arrival jitter calculation inter alia to decide on the delay for de-jitter buffering. RTP payloads (data flow D14) are stored in the FEC decoding buffer 3.4.

At the beginning of a session, no data is removed from the FEC decoding buffer 3.4 until a certain buffer occupancy level is reached or initial buffering delay is expired. After that, source RTP packets are moved out from the FEC decoding buffer 3.4 and repair RTP packets can be overwritten/discarded at a certain pace.

If there is at least one missing source packet in an FEC block, the receiving device 3 would try to correct the loss as follows: the de-tagging block 3.5 fetches tagged source and repair RTP payloads (data flow D15) of the FEC block from the FEC decoding buffer 3.4. The first FEC de-tagging block 3.5 removes the FEC tag from the payloads. The FEC payloads are transferred to the FEC decoder 3.6 which uses an appropriate FEC decoding algorithm to regenerate lost source media payloads and stores them as FEC-tagged payloads (data flow D17) back to the FEC decoding buffer 3.4.

The second FEC de-tagging block 3.7 fetches source RTP packets from the FEC decoding buffer 3.4. In the second FEC de-tagging block 3.7 the FEC tag is removed and a media RTP packet is formed by taking the first header included in the payload of the tagged source media payload and creating the media payload by copying the source media payload included in the tagged source media payload. After this operation the RTP packet flow (data flow D19) complies with the media payload specification of the media format and can be transferred to the de-packetizer 3.8.

The de-packetizer 3.8 de-packetizes the RTP packet flow D19 and separates the payload from the source RTP packets according to the media payload specification of the media format. This results into a bitstream or a stream of ADUs (data flow D20). Then, the media bitstream or the stream of ADUs can be decoded for further processing.

Generation of a FEC Block

Figure 5B:
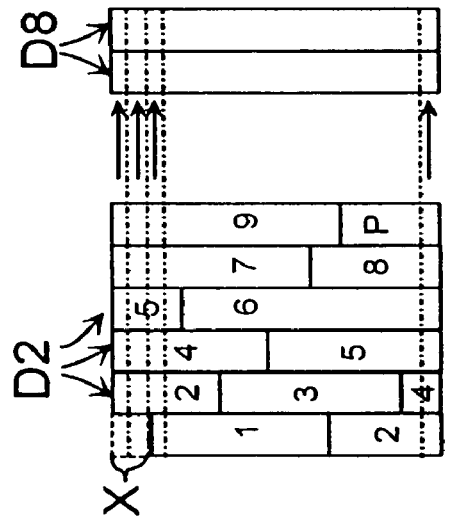
FIGS. 5a and 5b show examples of FEC block generation according to an example embodiment of the present invention in a simplified manner.
Figure 5A:
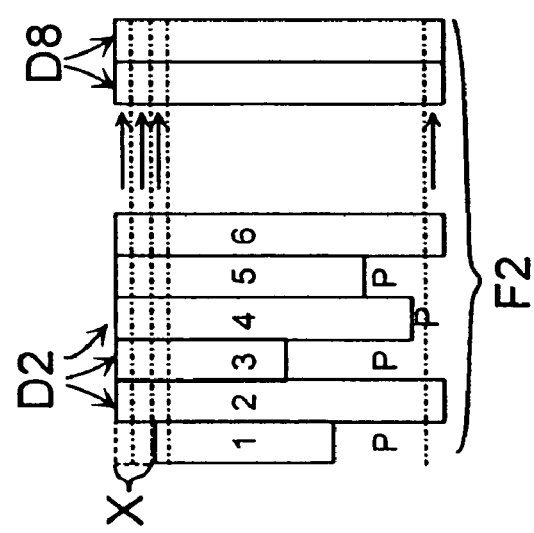

In FIG. 5*a* an example of FEC block generation according to an example embodiment of the present invention is depicted in a simplified manner. Source RTP packets D2 are organized deterministically into a FEC block F2, also known as FEC matrix, both in FEC encoding and FEC decoding. One example of locating source RTP packets in a FEC block F2 is to place each tagged source media payload (marked with numbers 1-6 in FIG. 5*a*), without the FEC tag, into a single column of the FEC block F2. A column can only contain one source media payload and the remaining of the column is padded (marked with letter P in FIG. 5*a*) with a pre-defined value. When the error correction information for the FEC repair packets is calculated, the initial buffering amount information can be located in a pre-defined location in the source block, e.g. allocating the two first byte locations of the FEC block as is illustrated with the reference X in FIGS. 5a and 5b. However, the error correction information is not necessarily transmitted at all but it can normally be reconstructed at the receiving device on the basis of the FEC repair packets. Each FEC repair packet is generated column-wise in the FEC block. A value in a FEC repair packet is derived by generating the FEC code over the respective row of data in the FEC matrix.

In FIG. 5b another example of FEC block generation according to an example embodiment of the present invention is depicted in a simplified manner. A FEC block F2 is generated such that
- the FEC block F2 contains a determined number of rows,
- each source RTP packet is located into the matrix column-wise (marked with numbers 1-6 in FIG. 5b),
- after the last byte location of a column, the next byte location is the top-most one in the next column on the right,
- the first source RTP packet is started from the top-left corner of the FEC block
- source RTP packets allocate the FEC block tightly, i.e. the first byte of a source RTP packet is in the next byte location after the last byte of the previous source RTP packet
- the last bytes of the last column of media data is padded with a pre-defined value (marked with letter P in FIG. 5b).

Signaling of Initial FEC Decoding Buffering

The initial FEC decoding buffering delay or buffer occupancy needs to be carried for each FEC block. In an example embodiment the initial FEC decoding buffering delay is signaled for each randomly accessible source block i.e. source block that contains a video random access point, such as an IDR picture in H.264/AVC.

In the following, some details of an example of the syntax and semantics for the initial buffering signaling will be presented.

At least the following options are possible when it comes to the location to carry the information:
- Modification of the format for tagged source RTP packets such that each tagged source RTP packet contains the information for initial FEC decoding buffering.
- Modification of the format for repair RTP packets such that each repair RTP packet contains the information for initial FEC decoding buffering. This option depends on a typical number of repair packets (versus a typical number of source packets) per FEC block. Receivers can easily parse the data according to this solution.
- FEC block generation such that the piece of information is located in a pre-defined location in the source block, e.g. allocating the two first byte locations of the FEC block as is illustrated with the reference X in FIGS. 5a and 5b. In FEC encoding, FEC repair packets D8 are calculated accordingly. No RTP packet D2 containing the piece of information as such relating to the signaling of initial FEC decoding buffering is generated or transmitted. In other words, the data X is not transmitted as such. In FEC decoding, the piece of information is therefore not received, but rather it is recovered using the FEC decoding process.

At least the following options are possible when it comes to the pieces of information to carry to describe the amount of initial FEC decoding buffering:
- Initial buffer occupancy in terms of bytes. This may cause an unnecessarily long initial buffering delay, when there are packet losses.
- Initial buffer occupancy in terms of sequence number difference. In this option the piece of coded information signals the RTP sequence number difference between the RTP sequence number of a packet in a pre-defined transmission order position in the FEC block, e.g. the RTP sequence number of the last repair packet of the FEC block, and the RTP sequence number of the packet whose reception triggers the start of FEC decoding. This solution is not commonly used in signaling the initial buffering occupancy in unicast streaming, because potential stream thinning operation affect the allocation of RTP sequence numbers. In multicast/broadcast, stream thinning is unlikely, and therefore the initial buffer occupancy in terms of sequence number difference can be pre-computed (and stored in a hint track of a 3GP file).
- Initial buffering delay in terms of wall clock time in the receiving device. This solution cannot probably cope with fast or slow startup or any other unexpected changes in packet transmission scheduling. Moreover, the solution requires timer-based operations in the receiver, which may be a bit more cumbersome to implement than simple comparisons.
- Initial buffering delay in terms of RTP timestamp difference. This requires that RTP timestamps are non-decreasing in sequence number order, which is generally not the case in video media payload formats. However, the RTP header of the tagged source RTP packet can be rewritten such that it does not contain the same value of timestamp as the corresponding media RTP packet. It is therefore possible that the RTP timestamp rules for the RTP header of tagged source RTP packets is the same as for repair RTP packets. An example of RTP timestamp determination rules in the transmitter is as follows: The timestamp rate shall be 10 kHz and shall be set to a time corresponding to the packet's transmission time. The timestamp value has no use in the actual FEC repair process and is only set to a value to produce reasonable resolution for arrival measuring and jitter calculation.

It is possible that the piece of coded information signals the RTP timestamp difference between the RTP timestamp of a packet in a pre-defined location or transmission order in the FEC block, e.g. the RTP timestamp of the last repair packet of the FEC block, and the RTP timestamp of the packet whose reception triggers the start of FEC decoding.

It should be noted here that this solution cannot probably cope with fast or slow startup or any other unexpected changes in packet transmission scheduling. To make the inter-arrival jitter calculation in the receiver more robust, it may be a good idea to change the RTP timestamp rule as proposed above.

Hypothetical Decoder

In the following, the operation of the hypothetical FEC decoder 1.9 will be described in more detail. The hypothetical FEC decoding buffer 1.91 (FIG. 4) is initially empty. Data transmission starts from the first packet in transmission order of an FEC block. Each tagged RTP payload is inserted to the hypothetical FEC decoding buffer 1.91 when it is transmitted. In addition to each RTP payload, the information for the initial FEC decoding buffering and the padding bytes needed to construct a source block according to the FEC code specification are inserted to the hypothetical FEC decoding buffer 1.91. When the last RTP packet of an FEC block is transmitted, the repair RTP payloads and padding for the FEC block, if any, are removed from the hypothetical FEC decoding buffer 1.91. In other words, no other data for the FEC block than the tagged source RTP packets remain in the hypothetical FEC decoding buffer. Original source RTP packets are not removed from the hypothetical FEC decoding buffer 1.91 before the transmission of RTP packet having the sequence number to trigger the end of the initial FEC decoding buffering. Then, the first original source RTP packet in sequence number order is removed. Each succeeding original source RTP packet is removed when a certain time since the removal of the previous packet has elapsed and all the packets in the same FEC block as the source packet have been transmitted. The certain time can be calculated e.g. as follows when a packet transmission according to the UDP/IP protocol is used:

> 8*(size of the previous RTP packet with UDP/*IP* overhead in bytes)/(1000* (value of "*b=AS*" SDP attribute for the stream)), in which the attribute "*b =AS*" indicates the bandwidth reserved for the stream in kbps (kilobits/s).

The equation gives the value for the certain time in seconds indicating the time needed to transmit the previous RTP packet by using the UDP/IP transmission protocol.

The transmitting device 1, such as an MBMS server, shall verify that the buffer occupancy level in the hypothetical FEC decoder 1.9 shall not exceed the required FEC decoding buffer size. If necessary, the hypothetical FEC decoder 1.9 may control the stream generator 1.0 to change some parameters to affect the buffer occupancy level. For example, the hypothetical FEC decoder 1.9 may control the frequency and/or number of formed media packets, the frequency and number of formed repair packets, and/or the transmission schedule of media and repair packets. Furthermore, the transmitting device 1 should be implemented so that the output of the hypothetical FEC decoder 1.9 complies with the media payload and decoding specifications of the media format.

In some implementations the size of the decoding buffer may not be constant but it can be changed according to the need. The hypothetical FEC decoder 1.9 may determine the necessary buffering size for the FEC decoding buffer. The determined size can then be indicated to the receiving device 3 which can reserve enough memory for the buffering.

The hypothetical decoder 1.9 can comprise a controller (not shown) for performing the above described operations, or the controller 1.14 of the transmitting device may be used as the controller of the hypothetical decoder 1.9.

The receiving device 3, such as an MBMS client, shall be capable of receiving an RTP packet stream that complies with the hypothetical FEC decoder 1.9. Furthermore, when the receiving device 3 complies with the requirements for the media decoding of the RTP packet stream, it shall be able to de-packetize and decode the RTP packet stream and output decoded data at the correct rate specified by the RTP timestamps of the received RTP packet stream.

Processing Delay of FEC Decoding

Processing delay for FEC decoding is not modeled in this description. This is a simplification assuming that the processing delay is handled in implementations by additional buffer space and buffering delay, if needed. Alternatively, one could specify a hypothetical buffering process that takes processing delay into account, e.g. similarly to Annex G of 3GPP TS 26.234.

Output Rate from FEC Decoding Buffer

Media decoders and their standards typically assume that coded bitstream is input at a (nearly) constant bitrate. In fact, video decoders are guaranteed to work only if the input bitrate to a coded picture buffer (CPB) is according to the HRDNBV of the video coding standard—in which constant bitrate or piece-wise constant, piece-wise zero bit-rate is expected. Therefore the output bitrate of the data flow D20, which should correspond to the encoded media stream in errorless transmission i.e. the output of the de-packetizer 3.8, and the hypothetical FEC decoding buffer should comply with the constraints of CPB.

The media-level bandwidth parameter should be included for each media stream in SDP descriptions used in MBMS. 'b=AS:' gives the RTP "session bandwidth" (including UDP/IP overhead). Furthermore, the output bitrate of the encoded media from the FEC receiver and the hypothetical FEC decoding buffer should correspond to the media-level bandwidth parameter signaled in SDP.

Tuning-In in Practice

As was previously mentioned in this description, MBMS is a multicast/broadcast service. It is likely to happen that a receiving device 3 tunes in a middle of a source block, i.e. start receiving data from another position than from the first bit of the first packet of a source block. Let us assume for a while that the receiving device 3 would receive a randomly accessible source packet within the remaining packets of the first source block. In addition to the signaled required initial buffering when the reception starts from the beginning of the source block, a correct amount of initial buffering would then depend on the amount of bits in the unreceived source packets preceding the first received one. The receiving device 3 may not be able to recover the non-received source packets based on the repair packets of the FEC block and correspondingly would not be able to conclude a correct duration of initial FEC decoding buffering.

One solution to this is to locate coded pictures or access units with random access points (e.g. intra/IDR pictures) as the first packets of an FEC block. The marker bit in the second header of the first tagged source RTP packet of a randomly accessible FEC block should be set to 1, otherwise it should be set to 0. Moreover, MBMS receiving devices 3 shall detect if the marker bit is set to 1 and start decoding no later than from the first tagged source packet in sequence number order in which the first source market bit is equal to 1. Furthermore, when MBMS receiving device 3 complies with the requirements for the media decoding of the RTP packet stream, it should be able to de-packetize and decode the RTP packet stream and output decoded data at the correct rate specified by the RTP timestamps of the received RTP packet stream.

Requirements for random access and randomly accessible source packet are specified separately for each media format allowed in the MBMS streaming delivery method.

An Example of Required FEC Decoding Buffer Size

According to an example embodiment it is determined that the required size of the needed hypothetical FEC decoding buffers to receive an MBMS session shall be 51200 bytes. This corresponds to 6.4 seconds of data in 64 kbps, when no padding is assumed in forming of source blocks. However, the invention is not restricted to such applications only.

If there are more than one media streams in an MBMS session, and the total size of the hypothetical FEC decoding buffer is divided according to the share in bitrates reported in "b=AS" media-level attributes. For example, if a session contains a 35-kbps video stream and a 14-kbps audio stream for which there are 10-kbps video FEC stream and 5-kbps audio FEC stream, the size of the hypothetical FEC decoding buffer for video is (35+10)/(35+14+10+5)*51200=36000 bytes and for audio, it is (14+5)/(35+14+10+5)*51200=15200 bytes.

It is possible to specify a MIME/SDP parameter signaling the actual requirement for the hypothetical FEC decoding buffer that is sufficient for correct reception of the stream.

This parameter would be similar to X-predecbufsize parameter specified for Annex G of 3GPP TS 26.234. The parameter can be used for optimizing the memory allocation in receiving devices (when an FEC decoding buffer smaller than the required size is actually needed) or specifying another buffer size share for the hypothetical FEC decoding buffers of different media streams in the session than the "implicit" buffer size determination as specified above.

Figure 4:
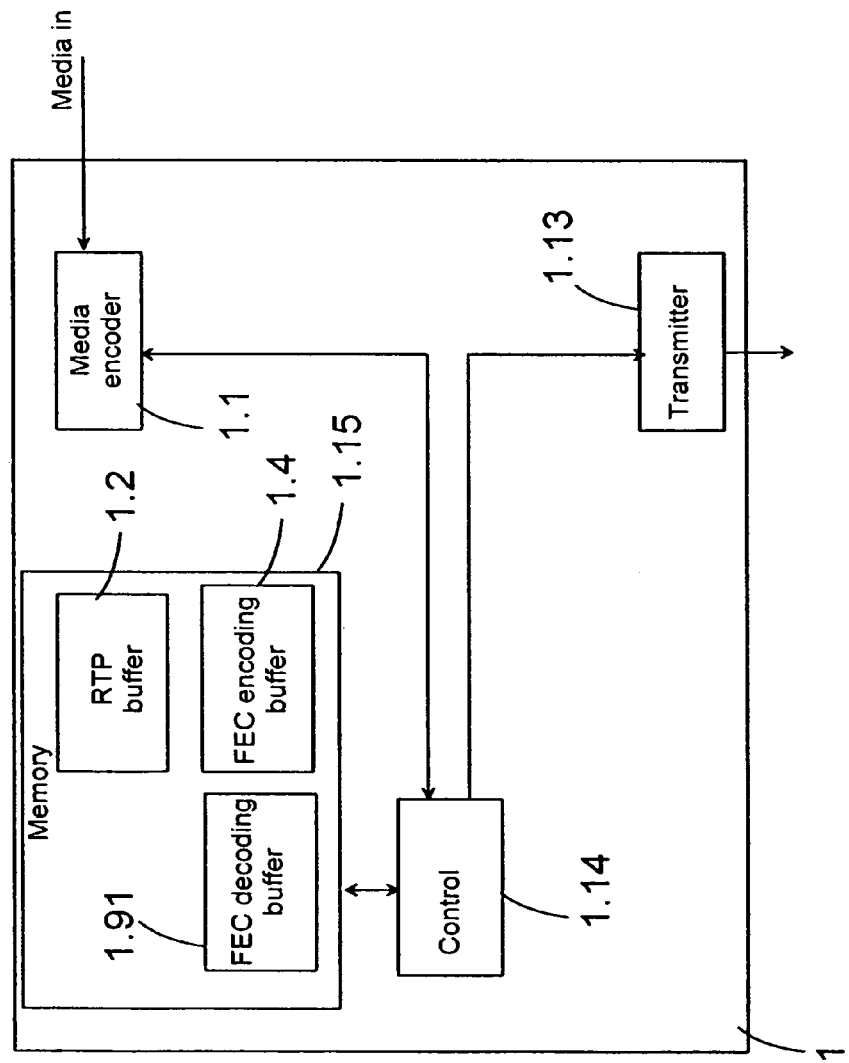
FIG. 4 shows a transmitting device according to an example embodiment of the present invention as a simplified block diagram.

In FIG. 4 an example of the transmitting device 1 is depicted as a simplified block diagram. The operation of the transmitting device 1 is controlled by the controller 1.14. The media to be transmitted can be input to the transmitting device 1 and/or the media can be saved to the memory 1.15 of the transmitting device 1. The buffers 1.2, 1.4, 1.91 needed in the transmission process can also be formed into the memory 1.15 of the transmitting device 1. The RTP packet streams can be transmitted by the transmitter 1.13.

What is claimed is:

1. A method comprising:
    forming media packets from at least one kind of media information;
    forming forward error correction data on the basis of the media packets;
    forming one or more repair packets on the basis of the forward error correction data;
    generating a transmission schedule for packets to be transmitted; and
    performing hypothetical decoding according to the transmission schedule comprising:
        buffering the packets to be transmitted according to the transmission schedule to a hypothetical decoding buffer; and
        controlling the buffer occupancy level of the hypothetical decoding buffer.

2. The method according to claim 1 comprising:
    forming a forward error correction block from a set of the media packets; and
    forming the forward error correction data for the forward error correction block.

3. The method according to claim 1 comprising:
    defining a sequence order number at least to the media packets indicating the transmission order of the media packets;
    defining an initial buffering amount for delaying the hypothetical decoding of the packets at the beginning of transmission of the packets; and
    defining the sequence number of the packet which shall be used as an indication for ending the initial buffering at the hypothetical decoding.

4. The method according to claim 3 wherein the hypothetical decoding further comprises:
    examining the sequence order number of the media packets to detect the media packet which indicates the end of the initial buffering; and
    removing one media packet from the hypothetical decoding buffer when the media packet which indicates the end of the initial buffering is detected.

5. The method according to claim 3 further comprising:
    including the initial buffering amount to the forward error correction data calculation, and
    leaving the initial buffering amount out from the packets to be transmitted.

6. A device comprising:
    a stream generator comprising
        a first packetizer for forming media packets from a media stream;
        an error correction code definer for forming forward error correction data on the basis of the media packets;
        a second packetizer for forming one or more repair packets on the basis of the forward error correction data; and
        a scheduler for generating a transmission schedule for packets to be transmitted; and
    a hypothetical decoder for performing hypothetical decoding during the transmission according to the transmission schedule comprising:
        a hypothetical buffer for buffering the packets to be transmitted according to the transmission schedule; and
        a controller for controlling the buffer occupancy level of the hypothetical decoding buffer.

7. The device according to claim 6 wherein a size for the hypothetical decoding buffer is determined such that the buffer occupancy does not exceed the determined size.

8. The device according to claim 6 wherein the size of the hypothetical decoding buffer is predetermined, wherein the hypothetical decoder is used to control the buffer occupancy level not to exceed the determined size by controlling at least one of the following:
    the frequency of formed media packets,
    the number of formed repair packets, and
    the transmission schedule of media and repair packets.

9. The device according to claim 6 wherein the first packetizer is used to form a forward error correction block from a set of the media packets; and the error correction code definer is used to form the forward error correction data for the forward error correction block.

10. The device according to claim 9 wherein the hypothetical decoder comprises a controller for examining the transmission schedule of packets stored in the hypothetical decoding buffer, wherein the controller is used to remove all the repair packets of a forward error correction block from the hypothetical decoding buffer after the last packet of said forward error correction block is scheduled to be transmitted.

11. The device according to claim 10 wherein the scheduler is used to schedule all the packets of the forward error correction block and the repair packets for transmission.

12. The device according to claim 10 wherein the scheduler is used to schedule the repair packets for transmission and leaving at least one of the media packets out from the packets to be transmitted.

13. The device according to claim 6 wherein
    a sequence order number is defined at least to the media packets indicating the transmission order of the media packets;
    an initial buffering amount for delaying the hypothetical decoding of the packets at the beginning of transmission of the packets is defined; and
    the sequence number of the packet which shall be used as an indication for ending the initial buffering at the hypothetical decoding is defined.

14. The device according to claim 13 wherein the hypothetical decoder is used to:
    examine the sequence order number of the media packets to detect the media packet which indicates the end of the initial buffering; and
    remove one media packet from the hypothetical decoding buffer when the media packet which indicates the end of the initial buffering is detected.

15. The device according to claim 14 wherein, after said one media packet is removed from the hypothetical decoding buffer, the hypothetical decoder is used to:

determine a time elapsed from the removal of a media packet;

compare the elapsed time to a time calculated by the following equation:

$$8*(\text{size of the previous media packet with transmission protocol overhead in bytes})/(1000*(\text{bandwidth reserved for the transmission of the media stream in kbps})); \text{ and}$$

remove a succeeding media packet from the hypothetical decoding buffer when the comparison indicates that the elapsed time is greater or equal than the calculated time.

16. The device according to claim 13 wherein the error correction code definer is used to:

include the initial buffering amount to the forward error correction data calculation, and leave the initial buffering amount out from the packets to be transmitted.

17. A system comprising:

a buffer for buffering a media stream comprising at least one kind of media information for transmission from a first device to a second device, the first device comprising:

a stream generator comprising a first packetizer for forming packets from the media stream;

an error correction code definer for forming forward error correction data on the basis of the media packets;

a second packetizer for forming one or more repair packets on the basis of the forward error correction data; and a scheduler for generating a transmission schedule for packets to be transmitted; and a hypothetical decoder for performing hypothetical decoding during the transmission according to the transmission schedule comprising:

a hypothetical buffer for buffering the packets to be transmitted according to the transmission schedule; and a controller for controlling the buffer occupancy level of the hypothetical decoding buffer.

18. The device of claim 17, wherein said first device is a server.

19. The device according to claim 18, wherein it is a Multimedia Broadcast/Multicast Service server, and that the transmitter is used to transmit the packets as a Multimedia Broadcast/Multicast Service.

20. A device comprising:

a receiver for receiving a packet stream including repair packets formed on the basis of at least one kind of media information, forward error correction data and information of an initial buffering amount for delaying the decoding of the packets at the beginning of reception of the packets;

a first de-packetizer for separating the packets from the media stream;

a buffer for buffering the information of the packets;

a decoder for decoding media information of the packets; and a controller for delaying the decoding according to the information of the initial buffering amount.

21. A storage medium having stored thereon a signal for transmitting a media stream comprising at least repair packets formed on the basis of at least one kind of media information, wherein the signal comprises information of such an initial buffering amount for delaying the decoding of the packets at the beginning of reception of the signal that makes repair packets arrive before respective media information is decoded.

22. The storage medium according to claim 21 wherein the signal comprises at least two blocks of packets and said initial buffering amount information for each of said at least two blocks of packets.

23. A computer readable medium stored with machine executable instructions for buffering packets of a media stream by, forming media packets from at least one kind of media information;

forming forward error correction data on the basis of the media packets;

forming one or more repair packets on the basis of the forward error correction data;

generating a transmission schedule for packets to be transmitted; and performing hypothetical decoding according to the transmission schedule comprising machine executable instructions for, buffering the packets to be transmitted according to the transmission schedule to a hypothetical decoding buffer; and controlling the buffer occupancy level of the hypothetical decoding buffer.

24. The computer program product according to claim 23, the controlling comprising machine executable instructions for removing all the repair packets from the hypothetical decoding buffer after the last repair packet is scheduled to be transmitted.

25. A chipset comprising:

a stream generator comprising a first packetizer for forming media packets from a media stream;

an error correction code definer for forming forward error correction data on the basis of the media packets;

a second packetizer for forming one or more repair packets on the basis of the forward error correction data; and a scheduler for generating a transmission schedule for packets to be transmitted; and a hypothetical decoder for performing hypothetical decoding during the transmission according to the transmission schedule comprising:

a hypothetical buffer for buffering the packets to be transmitted according to the transmission schedule; and a controller for controlling the buffer occupancy level of the hypothetical decoding buffer.

* * * * *